United States Patent [19]

Johnson

[11] 4,293,816

[45] Oct. 6, 1981

[54] BALANCED SEARCH LOOP FOR METAL DETECTOR

[75] Inventor: Douglas L. Johnson, Lebanon, Oreg.

[73] Assignee: White's Electronics, Inc., Sweet Home, Oreg.

[21] Appl. No.: 55,696

[22] Filed: Jul. 9, 1979

[51] Int. Cl.³ .............................................. G01V 3/11
[52] U.S. Cl. ...................................................... 324/329
[58] Field of Search ............................... 324/326–328, 324/329, 330, 339, 340, 222, 225, 239

[56] References Cited

U.S. PATENT DOCUMENTS

| | | | |
|---|---|---|---|
| 2,451,596 | 10/1948 | Wheeler | 324/329 |
| 3,108,220 | 10/1963 | Ruddock | 324/330 |
| 3,549,985 | 12/1970 | Penland | 324/326 |
| 3,882,374 | 5/1975 | McDaniel | 324/329 |
| 4,024,468 | 5/1977 | Hirschi | 324/329 |
| 4,030,026 | 6/1977 | Payne | 324/329 |

FOREIGN PATENT DOCUMENTS

| | | | |
|---|---|---|---|
| 232583 | 4/1969 | U.S.S.R. | 324/222 |
| 252631 | 2/1970 | U.S.S.R. | 324/222 |

OTHER PUBLICATIONS

Garrett, Chas., "*Successful Coin Hunting;*" Ram Publishing Co.; Copyright 1974, pp. 171–173, 189–192.

*Primary Examiner*—Gerard R. Strecker

*Attorney, Agent, or Firm*—Klarquist, Sparkman, Campbell, Leigh, Whinston & Dellett

[57] ABSTRACT

A search loop for a metal detector is described having a magnetic flux feedback coil whose magnetic flux opposes that of the transmit coil to provide a balanced loop. The balanced loop is thereby nulled and produces no output signal on the receive coil when such loop is positioned in air remote from the ground and no metal object is present. The transmit coil, the feedback coil and the receive coil are supported coplanar with each other and the feedback coil is supported on the receive coil so that it is concentric therewith. As a result of supporting the feedback coil on the receive coil, there is no relative movement between these two coils due to temperature changes or mechanical stress. Such movement tends to produce false output signals in the receive coil. In the preferred embodiment the feedback coil and the transmit coil are circular and are positioned concentric with a surrounding circular transmit coil. In one embodiment an electrostatic shield is provided between the feedback coil and the receive coil to reduce capacitive coupling. The balanced loop of the present invention can provide a balanced magnetic flux region within the receive coil even though it is not exactly concentric with the transmit coil so the loop is less expensive to manufacture but is capable of high sensitivity and good pinpointing of a target.

13 Claims, 6 Drawing Figures

U.S. Patent     Oct. 6, 1981     4,293,816
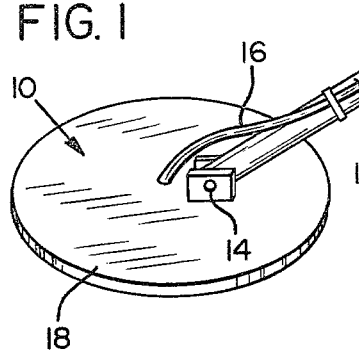
FIG. 1
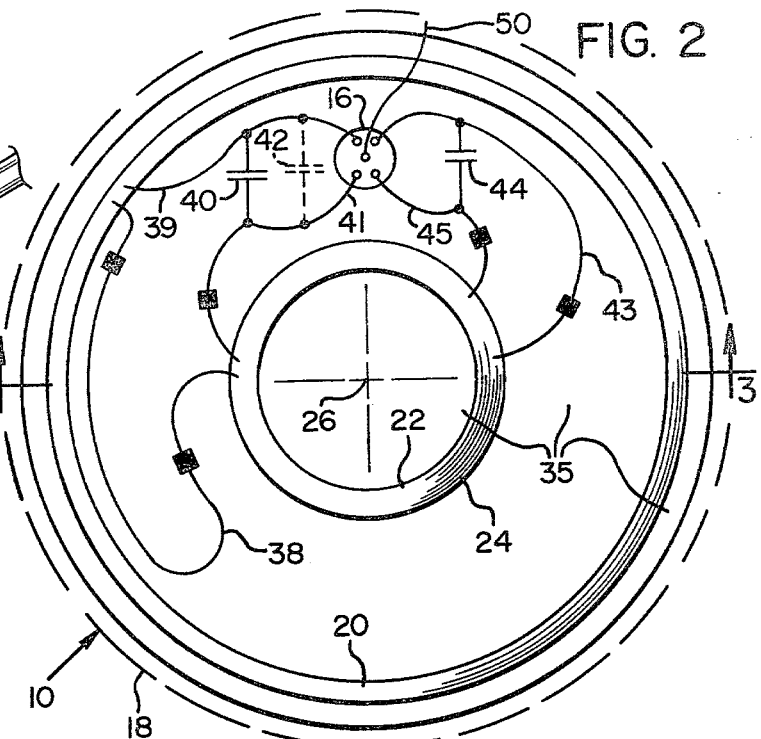
FIG. 2
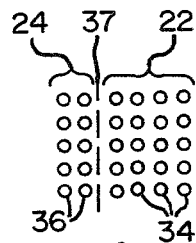
FIG. 4
FIG. 4A
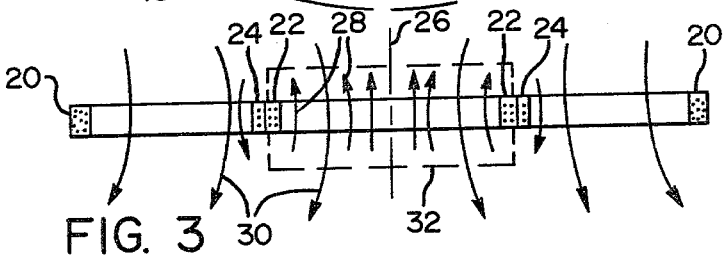
FIG. 3
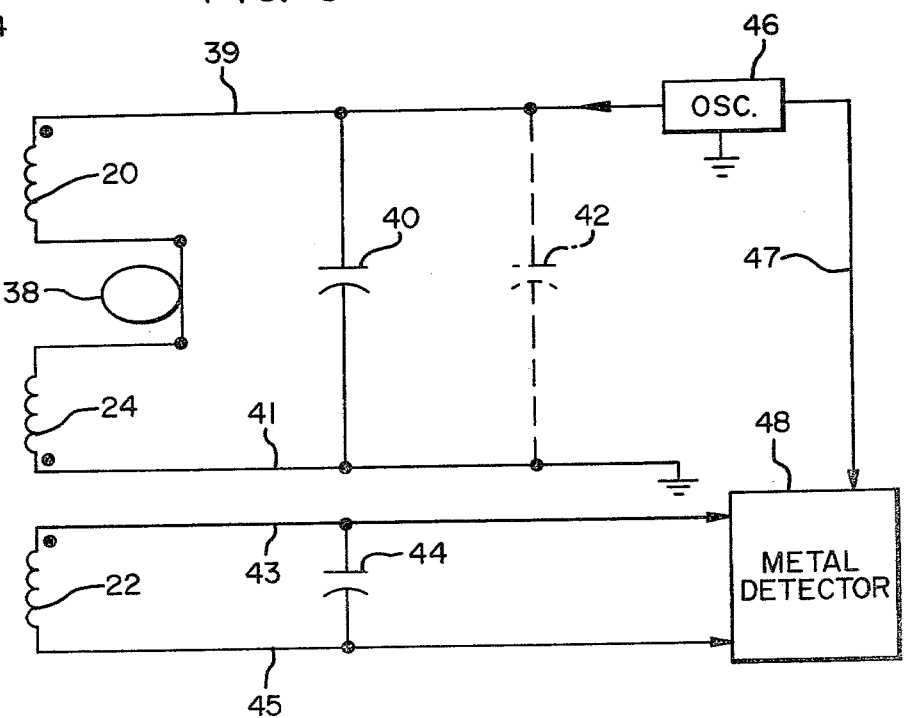
FIG. 5

BALANCED SEARCH LOOP FOR METAL DETECTOR

BACKGROUND OF INVENTION

The subject matter of the present invention relates to search loops for metal detectors and, in particular, to balanced search loops in which the magnetic flux produced by the transmit coil is balanced by the magnetic flux of an auxiliary coil so that the receive coil output voltage is nulled to substantially zero when no metal object is present and the loop is located in air remote from the ground. Previously, balanced search loops suffered from the defect that changes in temperature or mechanical stresses caused these coils to move relative to one another and produce a false output signal on the receive coil because the loop was no longer balanced. This problem is overcome in the balanced search loop of the present invention by supporting a magnetic flux feedback coil directly on the receive coil. The flux of the feedback coil cancels the flux of the transmit coil to provide a zero or balanced flux region containing the receive coil when no metal object is present. The present search loop has the additional advantage of providing a balanced flux region of a large area bounded by the receive coil which does not have to be exactly concentric with the transmit coil so the loop is less expensive to manufacture while also giving high sensitivity and good pinpointing of metal targets.

Previously it has been proposed to provide balanced search loops for metal detectors in plurality of different shapes and coil arrangements. For example, see the crossing coils, the coaxial coils, and the coplanar concentric coils shown in the book "Successful Treasure Hunting" by Charles Garrett published in 1974 and revised edition in 1978, pages 171 to 173 and 189 to 192. However, all of these prior loop designs suffer from the defect that during operation of the metal detector there is some relative movement of the coils with respect to one another due to temperature changes and/or mechanical stress on the coils. Since for sensitivity reasons the receive coil has many more turns than the transmit coil, there is a transformer step-up action which makes the receive coil output signal very sensitive to change in the relative position of the coils. In addition, in many designs the receive coil crosses the transmit coil or auxiliary coil used for balancing which means that with relative movement the overlapping area of the two coils increases in one portion and decreases in another portion of such area. This double effect makes the loop even more sensitive to relative movement due to temperature changes or mechanical stress. Furthermore, in many of these designs the magnetic field of the transmit coil is a complex pattern which results in nonuniformity of pickup sensitivity. As a result, maximum sensitivity is many times not in the geometric center of the loop; in addition, objects closer to the outside of the loop may generate signals of different phase from those generated by the same object at a farther distance from the loop. These phase differences cause errors in interpreting the response data of detectors since it causes the receive signals of conductive and magnetic targets to be reversed from their normal response.

The above problems are overcome in the balanced search loop of the present invention by supporting the auxiliary coil or magnetic flux feedback coil directly on the receive coil such as by wrapping the turns of the feedback coil over the outside turns of such receive coil. This makes the feedback coil concentric with the receive coil and causes substantially all of the magnetic flux from the feedback coil to intercept the receive coil. Since the feedback coil is supported on the receive coil, thermal expansion and mechanical stresses affect both of the coils equally causing no appreciable relative movement between the two coils. This means that the magnetic flux of the feedback coil can cancel the magnetic flux of the transmit coil which intercepts the receive coil to balance the loop at all times so that the output of the receive coil is substantially zero under a nulled condition in air and remote from the ground when no metal object is present. A larger region of balance is provided in the present loop which extends over substantially the entire area of the receive coil. Furthermore, the present loop is capable of high sensitivity and good pinpointing for locating the targets' position more exactly.

It is a simple matter by choosing the proper turns ratio between the feedback coil and the transmit coil to cause their magnetic flux to balance in the region bounded by the receive coil. This turns ratio is substantially equal to the ratio of the areas bounded by the feedback coil and the transmit coil. Fine adjustment or nulling is accomplished by movement of a partial coil turn connected between the transmit coil and feedback coil. It should be noted that the balance region is actually slightly larger than the receive coil which enables the receive coil and feedback coil to be more easily positioned correctly within the transmit coil during manufacture because they do not necessarily have to be exactly concentric with the transmit coil. In addition, there is no need for expensive "potting" of coils in epoxy resin since there can be some slight movement of the self-supported unit formed by the feedback coil and the receive coil relative to the transmit coil without causing erroneous receive signals.

SUMMARY OF INVENTION

It is, therefore, one object of the present invention to provide an improved search loop for a metal detector which is balanced so that the receive coil produces no output signal under nulled conditions.

Another object of the present invention is to provide such a balanced search loop in which a magnetic feedback coil is supported on a receive coil so that the loop remains balanced under conditions of temperature change or mechanical stress.

A further object of the invention is to provide such a search loop having an extremely large region of flux balance so that the position of the unit formed by the receive coil and the feedback coil can be moved relative to the transmit coil without affecting the null thereby enabling easier manufacture of the loop.

An additional object of the invention is to provide such a search loop having high sensitivity and good target pinpointing capabilities.

Still another object of the invention is to provide such a search loop in which the transmit coil, receive coil, and feedback coil are coplanar.

The still further object of the invention is to provide such a search loop in which the fine adjustment in the nulling of the loop is accomplished in an easier manner by movement of a partial turn of a coil which connects the transmit coil to the feedback coil.

A still additional object of the search loop of the present invention is to provide a uniform field to prevent false phase signals due to target objects being positioned at different locations relative to the search loop.

DRAWINGS

Other objects and advantages of the invention will be apparent from the following detailed description of a preferred embodiment thereof and from the attached drawings of which:

FIG. 1 is an oblique elevation view of the search loop of the present invention attached to the support rod of a metal detector;

FIG. 2 is a plan view of the search loop of FIG. 1 with the cover of the loop broken away to show internal structure;

FIG. 3 is a horizontal section view taken along line 3—3 of FIG. 2;

FIG. 4 is an enlarged view of a portion of FIG. 3 showing the feedback coil supported on the receive coil;

FIG. 4A is an enlarged view similar to FIG. 4 but showing the use of an electro-static shield between the feedback coil and the receive coil and;

FIG. 5 is the electrical circuit diagram of the feedback loop of the present invention connected to a metal detector.

DESCRIPTION OF PREFERRED EMBODIMENT

As shown in FIG. 1, a search loop 10 made in accordance with the present invention is attached to a support rod 12 of a metal detector by a pivot pin connection 14 and is electrically connected to the metal detector circuit by a cable 16. The search loop includes a plastic housing 18 which has been removed in FIG. 2 to show the coils of the search loop contained therein. The balanced search loop of the present invention includes a transmit coil 20, a receive coil 22, and a magnetic flux feedback coil 24, which are supported coplanar to one another by the housing 18.

As shown in FIG. 3, the feedback coil 24 is supported on the receive coil 22 throughout at least a major portion of its length by wrapping the turns of the feedback coil on the outside turns of the receive coil. In the preferred embodiment, the transmit coil 20, the receive coil 22, and the feedback coil 24 are all circular and are positioned concentric to one another so that they are all centered on a common central axis 26. However, it is possible that the unit formed by the receive coil 22 and the feedback coil 24 may be positioned somewhat off center from the axis 26 of the transmit coil and still give good results. Thus, magnetic flux 28 produced by the magnetic feedback coil 24 will cancel magnetic flux 30 of the transmit coil 18 in a balanced region 32 bounded by the receive coil 22 to null the output voltage of the receive coil 22 to substantially zero when the loop is positioned in air remote from the ground and any metal object. The balance region 32 can be produced even when the receive coil and feedback coil unit is moved somewhat off center from the central axis 26 of the transmit coil. This is important because it enables less expensive manufacturing of the balance search loop of the present invention since it does not require manual positioning adjustment and mounting of the receive coil exactly at the center of the transmit coil.

As shown in FIG. 4, each of the turns 34 of the receive coil 22 and each of the turns 36 of the feedback coil 24 are bonded together by the synthetic plastic insulating material provided over the metal wires forming such turns. This may be accomplished by means of so called "self-bonding wire" in which the insulation coating on such wire bonds together upon heating or upon immersion in a chemical solvent in a conventional manner. Under some conditions it may be necessary to reduce the capacitive coupling between the feedback coil and the receive coil by providing an electrostatic shield 37 between such coils, as shown in FIG. 4A. The shield may be a layer of metal foil wrapped over the outermost turns of the receive coil 22 before the turns of the feedback coil 24 are wrapped onto such receive coil. Of course, a conventional Faraday shield (not shown) may also be employed inside the bottom of the loop housing 18. Both shields are connected to D.C. ground potential by a conductor in Cable 16.

As shown in FIG. 2 a tuning coil 38 consisting of a portion of one turn of wire is connected between the output end of transmit coil 20 and the input end of feedback coil 24 for fine tuning the null balance condition. Thus, the position of the partial turn forming tuning coil 38 is adjusted until a minimum output voltage or null condition is achieved at the output of the receive coil 22. Null balancing of the search loop is achieved because while the transmit coil 20 and feedback coil 24 are connected in series through tuning coil 38, such transmit coil and feedback coil are wound in opposite directions to produce signal voltages of opposite polarity across such coils as indicated by the polarity dots at top and bottom of coils 20 and 24 in FIG. 5. Then the tuning coil is fixed in position by adhesive tape or other means prior to permanent bonding it to a loop housing insert 35 of plastic foam such as polystyrene foam during manufacture. For purposes of clarity the foam insert 35 has been removed from FIG. 3. The input end of the transmit coil 20 is connected by an electrical lead 39 in cable 16 to an oscillator 46 in the metal detector circuit. In a similar manner, the output end of the feedback loop 24 is connected by another electrical lead 41 thru cable 16 to ground or to the other output of the oscillator when a push pull rather than single ended output is provided by such oscillator. A capacitor 40 is connected between leads 39 and 41 across the series connection of coils 20, 38, and 24. In the one embodiment with an oscillator frequency of between 5,110 Hz and 5,140 Hz, the capacitor 40 has a value of 0.33 microfarads and may be a polycarbonate capacitor with a tolerance of ±5%. A second capacitor at 42 may be connected in parallel with capacitor 40 to tune the oscillator output signal to 5,125 Hz. In this case, the second capacitor 42 has the selected value which is necessary to provide the oscillator frequency of 5,125 Hz. The output terminals of the receive coil 22 are connected by leads 43 and 45 thru the cable 16 to the receive signal input of a metal detector circuit 48. A third capacitor 44 of a value of 0.027 microfarads similar in type to capacitor 42, is connected between the output leads 43 and 45 across the receive coil.

As shown in FIG. 5 the oscillator 46 is of a single ended output type which has one output connected to the input lead 39 of the transmit coil 20 and has another output connected thru lead 47 to the metal detector circuit 48 to provide a reference signal. The metal detector circuit may be of any suitable type such as the metal detector shown in the patent application Ser. No. 875,677 filed Nov. 6, 1978, by James P. Karbowski. Thus the receive signal produced on the output leads 43 and 45 of the receive coil is transmitted as the input to the metal detector circuit 48 and processed to indicate whether a metal object is present in the electromagnetic field of the transmit coil 20.

As shown in FIG. 2, a grounded lead 50 is provided in the cable 16 for connection to a Faraday shield (not shown) or to the electrostatic shield 37 of FIG. 4A.

In one preferred embodiment of the present invention, the loop housing 18 was provided with a diameter of approximately 8" and contained a transmit coil of eighty five turns of No. 27 self-bonding wire. The inner diameter of the transmit coil was 6.375 inches while its thickness or height was 0.188 inches. The receive coil 22 was provided by 275 turns of No. 31 self-bonding wire and had an inner diameter of 3.188 inches and a thickness or height of 0.219 inches. The feedback coil 24 was provided by 27 turns of No. 31 self-bonding wire wrapped on the outside of the receive coil. After winding the coils were mounted in the foam core 35 and glued in place with wood glue. After nulling, the receive coil output under balanced conditions is less than 6 millivolts peak to peak amplitude and has a lead phase difference relative to the transmit signal of 40 to 100 degrees.

It will be obvious to those having ordinary skill in the art that many changes may be made in the above described preferred embodiment of the present invention. Therefore, the scope of the present invention should only be determined by the following claims.

I claim:

1. A balanced search loop device, comprising:
   a transmit inductor coil means;
   means for applying an electrical signal to said transmit coil means to produce magnetic flux around the transmit coil;
   a receive inductor coil means;
   a magnetic flux feedback coil connected to said transmit coil so that its electromagnetic flux opposes the flux of the transmit coil in the region of the receive coil, the turns ratio of said transmit coil to said feedback coil being substantially the same as the ratio of the areas bounded by these coils to null balance the search loop in air; and
   support means for supporting said feedback coil on said receive coil means throughout at least a major portion of its length to prevent movement of the feedback coil relative to the receive coil due to temperature changes or mechanical movement of said coils, and to position at least a major portion of said feedback coil between said receive coil and said transmit coil.

2. A loop device in accordance with claim 1 which also includes electrostatic shield means between said feedback coil and said receive coil for shielding said coils from each other.

3. A loop device in connection with claim 1 in which the transmit coil means is concentric with said receive coil means and said feedback coil.

4. A loop device in accordance with claim 1 in which the transmit coil means, the receive coil means and the feedback coil are coplanar.

5. A loop device in accordance with claim 1 in which the feedback coil is wound on said receive coil.

6. A loop device in accordance with claim 1 in which the feedback coil is connected to null the residual output voltage of the receive coil to substantially zero when the loop is in air remote from the ground and no target is present.

7. A loop device in accordance with claim 6 in which the transmit coil is connected through a fine tuning turn to the receive coil, said tuning turn being adjustable in position to achieve said null.

8. A loop device in accordance with claim 1 in which the transmit coil, the receive coil, and the feedback coil are circular and are supported in a concentric, coplanar position with the transmit coil surrounding and spaced outwardly from the receive coil and the feedback coil.

9. A metal detector search loop device of the balanced inductor type comprising:
   a transmit inductor coil means;
   means for applying an electrical signal to said transmit coil means to produce magnetic flux around the transmit coil;
   a receive inductor coil means;
   a magnetic flux feedback coil connected in series with said transmit coil but of opposite polarity so that its electromagnetic flux opposes the flux of the transmit coil in a space region containing the receive coil and being of the proper turns ratio to the transmit coil to provide an electromagnetic field of substantially zero in said region to null balance the search loop in air when no metal object is adjacent said loop device; and
   support means for supporting said feedback coil on said receive coil throughout at least a major portion of its length to prevent movement of the receive coil relative to the feedback coil by winding it on said receive coil so that said transmit coil surrounds and is substantially coplanar with said feedback coil and said receive coil, and to position at least a major portion of said feedback coil between said receive coil and said transmit coil.

10. A loop device in accordance with claim 9 in which the feedback coil is concentric with the receive coil.

11. A loop device in accordance with claim 9 in which the feedback coil has fewer turns than the receive coil or the transmit coil.

12. A loop device in accordance with claim 11 in which the turns ratio of the transmit coil to the feedback coil is substantially the same as the ratio of the areas bounded by these coils.

13. A loop device in accordance with claim 9 which also includes an electrostatic shield between the feedback coil and the receive coil.

* * * * *

UNITED STATES PATENT AND TRADEMARK OFFICE
CERTIFICATE OF CORRECTION

PATENT NO. : 4,293,816
DATED : October 6, 1981
INVENTOR(S) : Douglas L. Johnson

It is certified that error appears in the above-identified patent and that said Letters Patent is hereby corrected as shown below:

In the Abstract

Line 16, delete "transmit" and insert --receive-- therefor.

Column 6, line 13, delete "receive" and insert --feedback-- therefor.

Signed and Sealed this

Third Day of September 1985

[SEAL]

Attest:

DONALD J. QUIGG

Attesting Officer    Acting Commissioner of Patents and Trademarks - Designate